(12) United States Patent
Daugherty et al.

(10) Patent No.: US 6,542,008 B1
(45) Date of Patent: Apr. 1, 2003

(54) SYSTEM AND METHOD FOR PROVIDING AN IMPEDANCE MATCH OF AN OUTPUT BUFFER TO A TRANSMISSION LINE

(75) Inventors: Dwight D. Daugherty, Ephrata, PA (US); Johannes G. Ransijn, Wyomissing Hills, PA (US); Gregory C. Salvador, Wernersville, PA (US); James D. Yoder, Leola, PA (US); Kenneth D. Gaynor, Reading, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/723,504

(22) Filed: Nov. 28, 2000

(51) Int. Cl.$^7$ ............................................. H03K 17/16
(52) U.S. Cl. .......................................... 327/30; 326/26
(58) Field of Search .............................. 326/30, 26, 21; 327/379, 384

(56) References Cited

U.S. PATENT DOCUMENTS

| | | | |
|---|---|---|---|
| 5,936,393 A | * | 8/1999 | Nauta .......................... 323/316 |
| 5,973,490 A | * | 10/1999 | Nauta .......................... 323/316 |
| 6,275,078 B1 | * | 8/2001 | Zabroda ........................ 327/108 |

FOREIGN PATENT DOCUMENTS

JP         404020120 A  *  1/1992  ................. 326/30

* cited by examiner

*Primary Examiner*—Michael Tokar
*Assistant Examiner*—James H. Cho

(57) ABSTRACT

A system and method are provided for providing an impedance match of an output buffer to a transmission line without significantly increasing the power consumption of the output buffer. A system and method are also provided for providing an impedance match of an output buffer to a transmission line, while still allowing for an adjustable output swing as is required for loads such as laser transmitters and optical modulators.

27 Claims, 2 Drawing Sheets

SYSTEM AND METHOD FOR PROVIDING AN IMPEDANCE MATCH OF AN OUTPUT BUFFER TO A TRANSMISSION LINE

BACKGROUND OF THE INVENTION

A. Field of the Invention

The present invention relates generally to transmission lines, and more particularly to providing an impedance match of an output buffer to a transmission line without significantly increasing the power consumption of the output buffer.

B. Description of the Prior Art

High-speed digital devices are generally interconnected by controlled impedance transmission lines, terminated on both ends with the characteristic impedance of the lines to prevent reflections from distorting the pulse being received. In principle, only one side of the transmission lines needs to be terminated. If it is the receiving end, then no reflections occur and the signal propagates undistorted to the far end load, where it appears as a delayed replica. If only the transmitting side is terminated, then the signal reflects at the receiving end back to the transmitting end, where it terminates. At the receiving end, the pulse remains undistorted, as long as the termination is either open or resistive.

In reality, due to parasitic effects and manufacturing tolerances, the transmission lines and their terminations are far from perfect and reflections in both directions will occur. The best performance is achieved when both terminations are implemented. The drawback to using double termination, however, is increased power consumption. For a given power delivered to the receiving end, the same power must be dissipated in the termination at the transmitting end. This can present a major problem when the output power is large, as is the case in, for example, an array of output buffers or a single, high power load. An example of the latter case is a laser or a modulator in an optical transmitter.

Accordingly, there is a need for providing an impedance match of an output buffer to a transmission line without significantly increasing the power consumption of the output buffer.

A need also exists for providing an impedance match of an output buffer to a transmission line, while still allowing for an adjustable output swing as is required for loads such as laser transmitters and optical modulators.

SUMMARY OF THE INVENTION

The present invention provides a system and method for providing an impedance match of an output buffer to a transmission line without significantly increasing the power consumption of the output buffer. In an alternative embodiment of the present invention, a system and method are provided for providing an impedance match of an output buffer to a transmission line, while still allowing for an adjustable output swing as is required for loads such as laser transmitters and optical modulators.

BRIEF DESCRIPTION OF THE DRAWINGS

Further features of the present invention will become more apparent from the following detailed description of specific embodiments thereof when read in conjunction with the accompanying drawings, in which like elements have like reference numerals and in which.

DETAILED DESCRIPTION OF THE PREFERRED EMBODIMENTS

Figure 1:
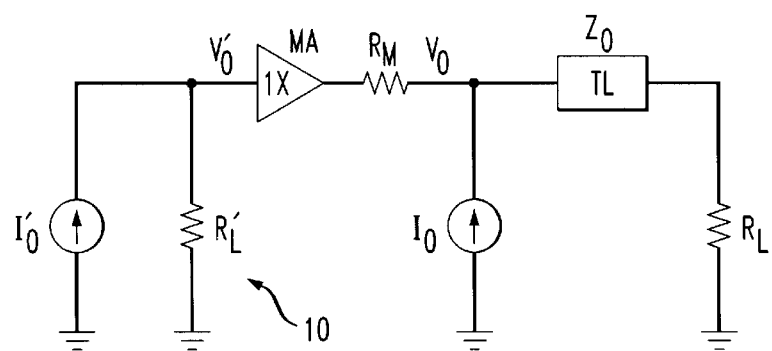
FIG. 1 is a schematic diagram of a system according to the present invention.

With reference to FIG. 1, there is shown a schematic diagram of the system of the present invention. A transmission line TL having an impedance $Z_0$ is terminated with an impedance $R_L$ representing the load, and is driven by a current source $I_0$, controlled by the data input signal. An approximate voltage replica $V_0'$ of the intended output voltage $V_0 = I_0 Z_0$ is generated by a current source $I_0' = I_0/k$ coupled to $I_0$, and a load resistor $R_L' = kZ_0$ of an output buffer 10. Unity-gain matching amplifier MA with output impedance $R_M = Z_0$ buffers $V_0'$. Reflections due to mismatch between $R_M$ and the load appear across $R_M$ and are thus absorbed. Since the voltage between input and output of MA is essentially zero, no signal power is dissipated in the output of MA. The power reduction as compared to brute force termination results from the fact that MA only needs to accommodate reflections, which are only a fraction of the size of the signal impressed upon the load.

Figure 2:
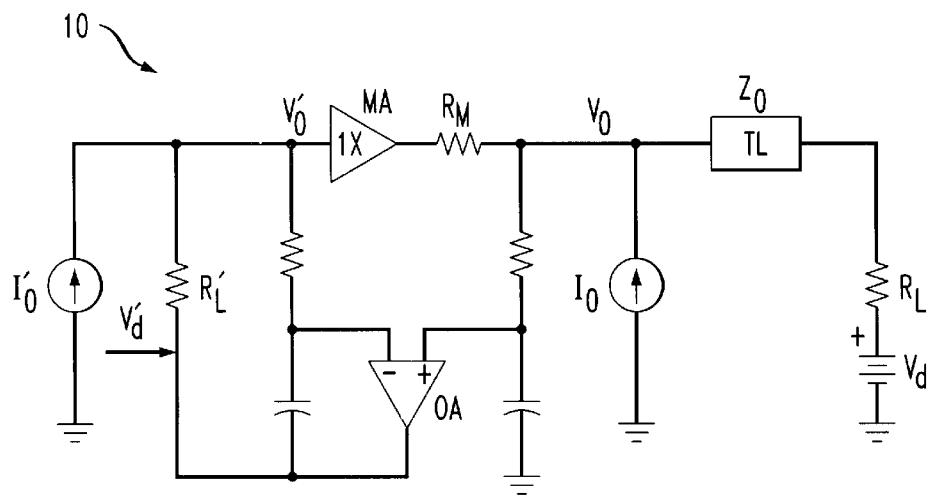
FIG. 2 is a schematic diagram of an alternative system according to the present invention where a load is subjected to an external DC offset.

Complications arise when the load is subjected to an external DC offset, as is often the case in optical transmitters. A laser diode has an offset $V_d$, due to the diode turn-on voltage in addition to the voltage drop due to the bias current used to bias the laser at threshold. An electro-absorption modulator requires an external bias to control the extinction ratio. The external offset must be compensated for in the output buffer to prevent the matching amplifier MA from sinking (or sourcing) excess current. Because the external DC offset is unknown, the compensation must be derived indirectly, by sensing the average voltage between input and output of the matching buffer, with an operational amplifier OA, as shown by FIG. 2, and driving this voltage to zero by controlling the DC offset $V_d'$ of dummy load $R_L'$. Effectively, this DC control loop allows the output buffer 10 to completely reject external DC sources, while maintaining DC coupling from input to output. As a result, the reduction in power dissipation of the overall transmitter can be significant. An example is given below with reference to FIG. 3, along with a comparison to a resistively back-terminated output buffer.

Figure 3:
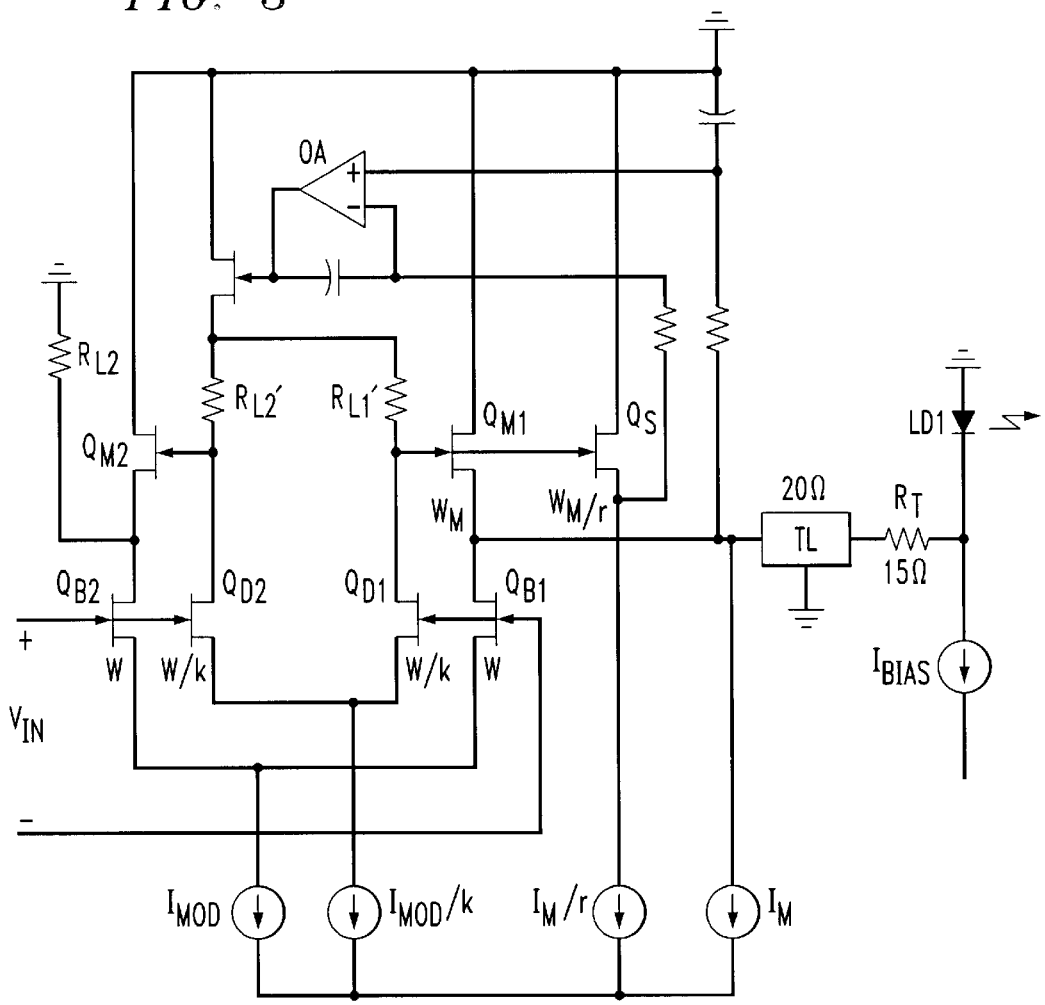
FIG. 3 is a schematic diagram showing an implementation of a laser driver output buffer using the principles of the present invention.

FIG. 3 shows an implementation of a laser driver output buffer using the principles of the present invention. This particular example is a differential circuit built with FET devices, used to drive a laser diode, but a single-ended implementation or one using bipolar devices is also feasible. The differential implementation allows for a tight control of the modulation current $I_{mod}$. The function of the controlled current source $I_0$ driving the load of FIG. 2 is assumed here by transistor $Q_{B1}$ having a width W. Device $Q_{D1}$ having a width W/k, where k is a constant, represents the dummy controlled source $I_0'$. Source follower $Q_{M1}$ having a width $W_M$ and biased by current source $I_M$ provides the match to the load, which consists of a 20-ohm transmission line, a 15-ohm termination resistor $R_T$ and a laser diode LD1. The laser diode LD1 has an internal resistance of about 5 ohms and a turn-on voltage between 0.7 and 1.2 V. To sense the voltage between input and output of source follower $Q_{M1}$, a scaled-down source follower $Q_S$ having a width $W_M/r$ is employed, whose bias voltages $V_{GS}$ and $V_{DS}$ match those of $Q_{M1}$. $Q_S$ compensates for the $V_{GS}$ voltage drop of $Q_{M1}$. By making the ratio "r" of device size to bias current of $Q_S$ and $Q_{M1}$ equal, the operational amplifier loop maintains a constant bias current for $Q_{M1}$, equal to $I_M$.

Figure 4:
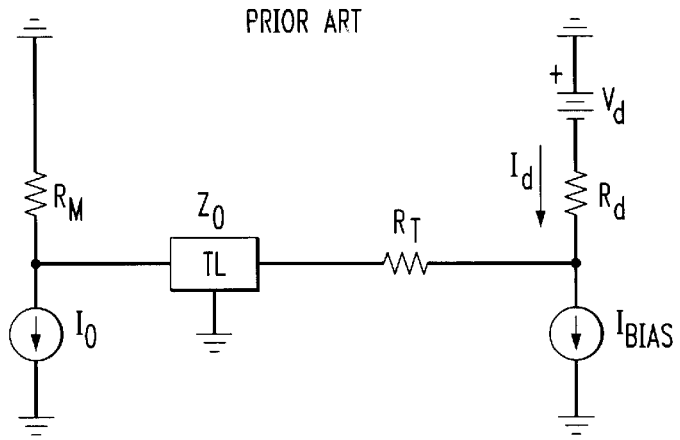
FIG. 4 is a schematic diagram showing a laser driver with resistive back termination as known in the prior art for comparison purposes.

The implementation of a laser driver output buffer uses a modulation-to-dummy current ratio k of 8. The source follower bias current is 12 mA. At the maximum modulation current of 120 mA, the overhead associated with the active match is 120/8+12=27 mA. For comparison purposes, FIG. 4 shows a laser driver output buffer with a 20-ohm resistive back termination as known in the prior art. For the element values shown above, assuming a perfect match ($R_M = R_T + R_d = Z_0$), the current through the laser can be expressed as:

$$I_d = I_{0d} + I_{BIASd} = \frac{1}{2}I_0 + \left[1 - \frac{R_d}{2Z_0}\right]I_{BIAS} - \frac{V_d}{2Z_0}$$

Hence, $$I_0 = 2I_{0d}$$

and $$I_{BIAS} = \left[1 + \frac{R_d}{2Z_0 - R_d}\right]I_{BIASd} + \frac{V_d}{2Z_0 - R_d}$$

The required modulation current $I_0$ is doubled, while the required bias current $I_{BIAS}$ is increased by 20 to 34.3 mA ($V_d/35\Omega$) plus 1/7 (5/35) of the actual bias current through the laser. At 120 mA diode modulation and 100 mA diode bias, the resistively terminated buffer uses 240 mA modulation current and 134.3 to 148.6 mA bias current. Overall, the actively matched buffer according to the principles of the present invention requires 37 to 39% less current in comparison.

The case of a modulator driver with external bias is similar. For a typical modulation current of 60 mA and a bias current of 20 mA into the 50-ohm load, a buffer with 50 ohm resistive termination requires an actual modulation current of 120 mA and an actual bias current of 40 mA, as half of the current flows through the termination resistor. The actively terminated buffer, however, only requires the 60+20 mA output capability plus 16 mA overhead. The power required for the output buffer in this case is reduced by [(1−96)/160]−100%=40%.

Accordingly, with the present invention, a typical reduction of 37 to 40% in output buffer power consumption is achieved, with a similar power reduction in driver stages, preceding the output buffer. Also, the output buffer as implemented by the present invention adapts to different DC termination voltages at the receiving end and prevents DC loading of the terminating circuitry.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A system for providing an impedance match of an output buffer to a transmission line terminated with an impedance $R_L$ and driven by a current source $I_0$, the system comprising:

means for generating an approximate voltage replica $V_0'$ of output voltage $V_0$ utilizing a current source $I_0'$; and means for buffering a voltage replica $V_0'$, the means for buffering having an output impedance $R_M$ approximately equal to an impedance $Z_0$ of the transmission line, wherein the output voltage $V_0$ is equal to $I_0 Z_0$ and the current sources $I_0$ and $I_0'$ are independent of one another.

2. The system according to claim 1, wherein the means for generating is coupled to the current source $I_0$.

3. The system according to claim 1, wherein the means for generating comprises the current source $I_0'$ and a load resistor $R_L'$.

4. The system according to claim 3, wherein the current source $I_0'$ and the load resistor $R_L'$ are parallel to each other and the current source $I_0$ and in series with the means for buffering.

5. The system according to claim 1, further comprising means for sensing an average voltage between input and output of the means for buffering.

6. The system according to claim 5, further comprising means for driving the average voltage to zero by controlling a DC offset of a load resistor coupled to the means for buffering.

7. The system according to claim 5, wherein the means for sensing includes an operational amplifier.

8. The system according to claim 1, wherein the means for buffering includes a unity-gain matching amplifier, wherein no signal power is dissipated in the unity-gain matching amplifier output.

9. The system according to claim 8, wherein the voltage between input and output of the unity-gain matching amplifier is approximately zero.

10. The system according to claim 1, wherein the system absorbs reflections due to a mismatch between the output impedance $R_M$ and the impedance $R_L$.

11. A method for providing an impedance match of an output buffer in a transmission line terminated with an impedance $R_L$ and driven by a current source $I_0$, the method comprising the steps of:

generating an approximate voltage replica $V_0'$ of an output voltage $V_0$ utilizing a current source $I_0'$; and buffering the voltage replica $V_0'$ with a buffer having an output impedance $R_M$ approximately equal to an impedance $Z_0$ of the transmission line, wherein the output voltage $V_0$ is equal to $I_0 Z_0$ and the current sources $I_0$ and $I_0'$ are independent of one another.

12. The method according to claim 11, wherein the step of generating comprises the steps of providing the current source $I_0'$ and a load resistor $R_L'$ in parallel with each other and in series with the buffer.

13. The method according to claim 11, further comprising the steps of:

sensing an average voltage between input and output of the buffer with an operational amplifier; and driving the average voltage to zero.

14. The method according to claim 13, wherein the step of driving comprises the step of controlling a DC offset of a load resistor $R_L'$.

15. The method according to claim 11, wherein the buffer is a unity-gain matching amplifier, wherein no signal power is dissipated in the unity-gain matching amplifier output.

16. The method according to claim 15, wherein the voltage between input and output of the unity-gain matching amplifier is approximately zero.

17. The method according to claim 11, further comprising the step of absorbing reflections due to a mismatch between the output impedance $R_M$ and the impedance $R_L$.

18. An output buffer for coupling to a transmission line terminated with an impedance $R_L$ and driven by a current source $I_0$ for providing an impedance match of the output buffer to the transmission line, the output buffer comprising:

means for generating an approximate voltage replica $V_0'$ of an output voltage $V_0$ utilizing a current source $I_0'$; and means for buffering the voltage replica $V_0'$, the means for buffering having an output impedance $R_M$ approximately equal to an impedance $Z_0$ of the transmission line, wherein the output voltage $V_0$ is equal to $I_0 Z_0$ and current sources $I_0$ and $I_0'$ are independent of one another.

19. The output buffer according to claim 18, wherein the means for generating is coupled to the current source $I_0$.

20. The output buffer according to claim 18, wherein the means for generating comprises the current source $I_0'$ and a load resistor $R_L'$.

21. The output buffer according to claim 20, wherein the current source $I_0'$ and the load resistor $R_L'$ are parallel to each other and the current source $I_0$ and in series with the means for buffering.

22. The output buffer according to claim 18, wherein the means for buffering includes a unity-gain matching amplifier, wherein no signal power is dissipated in the unity-gain matching amplifier output.

23. The output buffer according to claim 22, wherein the voltage between input and output of the unity-gain matching amplifier is approximately zero.

24. The output buffer according to claim 18, wherein the output buffer absorbs reflections due to a mismatch between the output impedance $R_M$ and the impedance $R_L$.

25. The output buffer according to claim 18, further comprising means for sensing an average voltage between input and output of the means for buffering.

26. The output buffer according to claim 25, further comprising means for driving the average voltage to zero by controlling a DC offset of a load resistor coupled to the means for buffering.

27. The output buffer according to claim 25, wherein the means for sensing includes an operational amplifier.

* * * * *